(12) United States Patent
Xiao et al.

(10) Patent No.: US 12,061,932 B2
(45) Date of Patent: Aug. 13, 2024

(54) MULTI-LEADER ELECTION IN A DISTRIBUTED COMPUTING SYSTEM

(71) Applicant: Dell Products L.P., Round Rock, TX (US)

(72) Inventors: Pan Xiao, Chengdu (CN); Xuhui Yang, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 428 days.

(21) Appl. No.: 17/562,094

(22) Filed: Dec. 27, 2021

(65) Prior Publication Data

US 2023/0195522 A1    Jun. 22, 2023

(30) Foreign Application Priority Data

Dec. 17, 2021 (CN) .......................... 202111558591.0

(51) Int. Cl.
*G06F 3/00* (2006.01)
*G06F 9/50* (2006.01)

(52) U.S. Cl.
CPC .................................. *G06F 9/5027* (2013.01)

(58) Field of Classification Search
CPC ....................................................... G06F 9/50
See application file for complete search history.

(56) References Cited

U.S. PATENT DOCUMENTS

| | | | |
|---|---|---|---|
| 5,293,620 A * | 3/1994 | Barabash | G06F 9/4881 718/102 |
| 5,408,663 A * | 4/1995 | Miller | G06Q 10/06 718/104 |

(Continued)

FOREIGN PATENT DOCUMENTS

| | | | | |
|---|---|---|---|---|
| EP | 1448042 A1 * | 8/2004 | ......... | H05K 13/0452 |
| JP | S63163667 A * | 2/1998 | | |

(Continued)

OTHER PUBLICATIONS

Onn Shehory, Methods for task allocation via agent coalition formation, (Year: 1998).*

(Continued)

*Primary Examiner* — Lechi Truong
(74) *Attorney, Agent, or Firm* — Ryan, Mason & Lewis, LLP

(57) ABSTRACT

An apparatus in an illustrative embodiment comprises at least one processing device that includes a processor coupled to a memory. The at least one processing device is configured to establish with a coordination service for one or more distributed applications a participant identifier for a given participant in a multi-leader election algorithm implemented in a distributed computing system comprising multiple compute nodes, the compute nodes corresponding to participants having respective participant identifiers, and to interact with the coordination service in performing an iteration of the multi-leader election algorithm to determine a current assignment of respective ones of the participants as leaders for respective processing tasks of the distributed computing system. In some embodiments, the at least one processing device comprises at least a portion of a particular one of the compute nodes of the distributed computing system, and the coordination service comprises one or more external servers.

20 Claims, 14 Drawing Sheets

(56) References Cited

U.S. PATENT DOCUMENTS

| | | | |
|---|---|---|---|
| 9,870,269 B1* | 1/2018 | Viswanathan | G06F 9/5055 |
| 2006/0271935 A1* | 11/2006 | Cox | H04L 67/55 |
| | | | 718/102 |
| 2008/0301042 A1* | 12/2008 | Patzer | G06Q 20/10 |
| | | | 705/39 |
| 2010/0118809 A1* | 5/2010 | Cha | H04W 16/10 |
| | | | 370/329 |
| 2010/0297626 A1* | 11/2010 | McKernan | C12Q 1/6874 |
| | | | 435/6.1 |
| 2017/0010918 A1* | 1/2017 | Sato | G06F 9/5027 |
| 2017/0255500 A1* | 9/2017 | Carnevale | G06F 9/4881 |
| 2020/0159589 A1* | 5/2020 | Capes | G06N 7/08 |
| 2022/0309139 A1* | 9/2022 | Chae | G06F 21/32 |
| 2024/0140713 A1* | 5/2024 | Aisu | B65G 1/1373 |
| 2024/0160476 A1* | 5/2024 | Sandstrom | G06F 9/5038 |

FOREIGN PATENT DOCUMENTS

| | | | | |
|---|---|---|---|---|
| JP | 2000040099 A | * | 2/2000 | |
| JP | 2004295458 A | * | 10/2004 | G06F 17/30286 |

OTHER PUBLICATIONS

M. Brooker, "Leader Election in Distributed Systems," https://aws.amazon.com/builders-library/leader-election-in-distributed-systems/, Accessed Nov. 12, 2021, 8 pages.

Wikipedia, "Leader Election," https://en.wikipedia.org/w/index.php?title=Leader_election&oldid=1052939206, Oct. 31, 2021, 10 pages.

kubernetes.io, "Simple Leader Election with Kubernetes and Docker," https://kubernetes.io/blog/2016/01/simple-leader-election-with-kubernetes/, Jan. 11, 2016, 3 pages.

* cited by examiner

MULTI-LEADER ELECTION IN A DISTRIBUTED COMPUTING SYSTEM

RELATED APPLICATION(S)

The present application claims priority to Chinese Patent Application No. 202111558591.0, filed Dec. 17, 2021, and entitled "Multi-Leader Election in a Distributed Computing System," which is incorporated by reference herein in its entirety.

FIELD

The field relates generally to distributed computing systems comprising clusters of nodes, and more particularly to leader election within such systems.

BACKGROUND

A wide variety of different types of distributed computing systems are known. For example, distributed computing systems based on the open-source Kubernetes container orchestration platform include clusters of nodes that each implement one or more "pods" of containers for executing containerized workloads for distributed applications. A need exists for improved techniques for use in these and other distributed computing systems, particularly with regard to leader election.

SUMMARY

A technical problem that arises in distributed computing systems relates to leader election, in that conventional approaches typically require election of only a particular one of the nodes as a leader at any given time, which can lead to processing bottlenecks on the particular node that is currently elected as the leader.

Illustrative embodiments disclosed herein provide techniques for multi-leader election in a distributed computing system. For example, some embodiments provide a technical solution to the above-noted technical problem by configuring multiple nodes of a cluster to cooperate with one another to elect multiple leaders for respective processing tasks in a manner that facilitates the balancing of the processing tasks across the nodes, leading to improved overall performance within the distributed computing system.

In one embodiment, an apparatus comprises at least one processing device that includes a processor coupled to a memory. The at least one processing device is configured to establish with a coordination service for one or more distributed applications a participant identifier for a given participant in a multi-leader election algorithm implemented in a distributed computing system comprising multiple compute nodes, the compute nodes corresponding to participants having respective participant identifiers, and to interact with the coordination service in performing an iteration of the multi-leader election algorithm to determine a current assignment of respective ones of the participants as leaders for respective processing tasks of the distributed computing system.

In some embodiments, the at least one processing device illustratively comprises at least a portion of a particular one of the compute nodes of the distributed computing system, and the coordination service comprises one or more servers that are external to the distributed computing system.

The coordination service in some embodiments comprises an open-source Apache ZooKeeper coordination service, although other types of coordination services can be used in other embodiments.

In some embodiments, establishing with a coordination service for one or more distributed applications a participant identifier for a given participant in a multi-leader election algorithm illustratively comprises requesting creation of a participant identifier tree node for the given participant as a sequential and ephemeral node, and receiving the participant identifier for the given participant in response to the request.

Additionally or alternatively, in some embodiments, interacting with the coordination service in performing an iteration of the multi-leader election algorithm illustratively comprises obtaining values of participant identifier tree nodes and election results tree nodes from the coordination service, and utilizing the obtained values to maintain a stack data structure in which participants are sorted into entries of the stack data structure based at least in part on number of processing tasks for which they are assigned as leader. Responsive to at least one of the processing tasks not currently having an assigned leader, interacting with the coordination service comprises assigning a particular participant to a given one of the previously unassigned processing tasks based at least in part on a position of an entry for that participant in the stack data structure, updating the stack data structure and one or more corresponding values of the election results tree nodes with the coordination service, and repeating the assigning and updating until leaders are assigned to all of the processing tasks.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
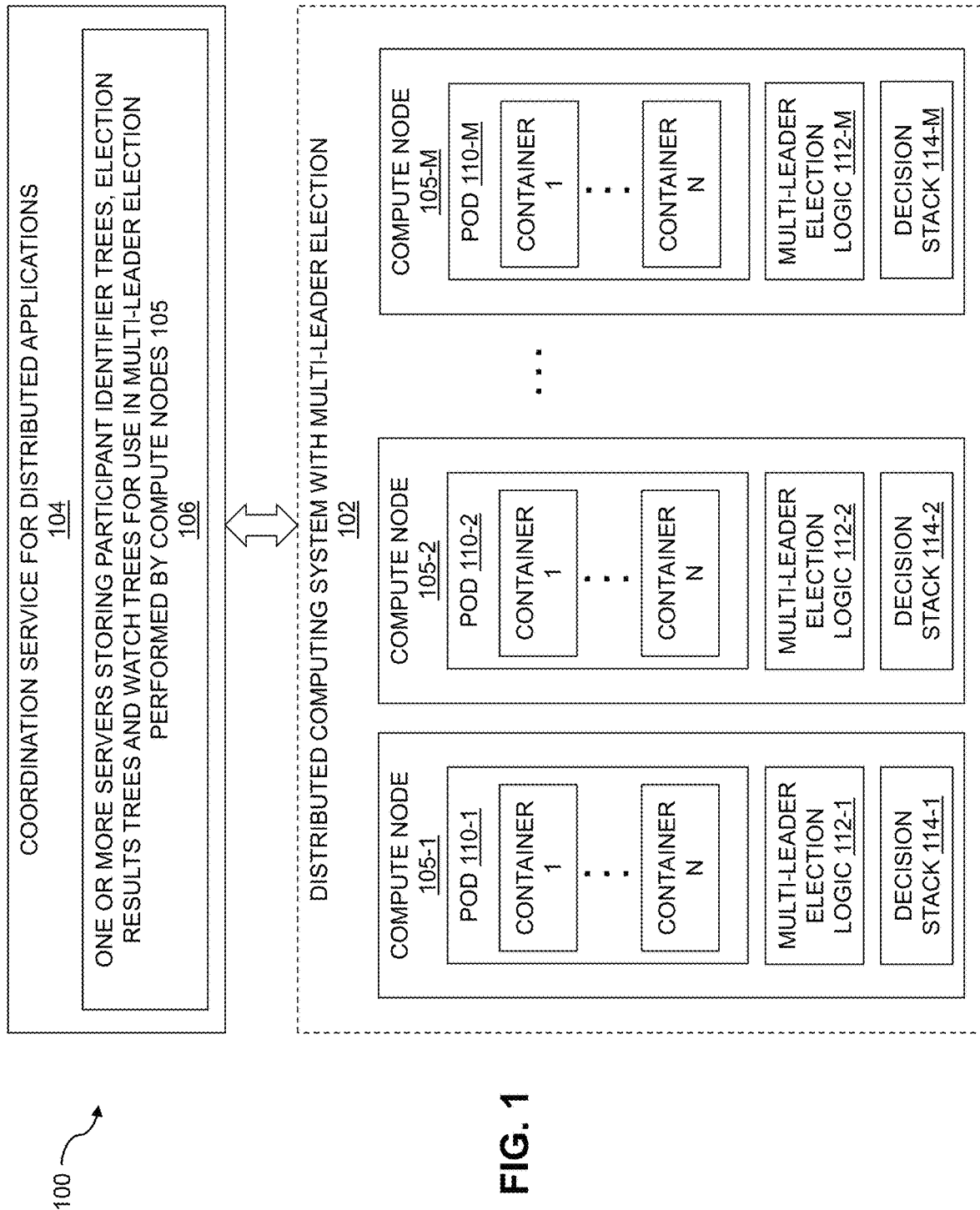
FIG. 1 is a block diagram of an information processing system that includes a distributed computing system comprising a cluster of nodes that implement multi-leader election in an illustrative embodiment.

FIG. 1 shows an information processing system 100 configured in accordance with an illustrative embodiment. The information processing system 100 comprises a distributed computing system 102 that is configured to communicate over one or more networks with a coordination service 104 for one or more distributed applications executed by the distributed computing system 102 and possibly for other distributed applications executed by other distributed computing systems not explicitly shown in the figure.

The coordination service 104 illustratively comprises an open-source coordination service for distributed applications, such as the well-known Apache ZooKeeper coordination service, suitably configured in the manner disclosed herein, although other types of coordination services can be used in other embodiments.

The distributed computing system 102 more particularly comprises compute nodes 105-1, 105-2, ... 105-M, collectively referred to herein as compute nodes 105. The distributed computing system 102 in some embodiments is assumed to be based on the open-source Kubernetes container orchestration platform, and illustratively includes a cluster of compute nodes 105 that each implement one or more pods 110 of containers for executing containerized workloads for distributed applications. Each of the pods 110 in this example illustratively includes a set of N containers, which may be Docker containers or other types of Linux containers (LXCs). In other embodiments, different ones of the pods 110-1, 110-2, ... 110-M may include different numbers of containers. Also, the values N and M in this embodiment denote arbitrary integer values that are assumed to be greater than or equal to two.

The distributed computing system 102 in some embodiments herein is referred to as a "cluster" and the compute nodes 105 are simply referred to as "nodes." In some embodiments, each node comprises a single pod, while in other embodiments one or more of the nodes may each comprise multiple pods.

In some embodiments, the compute nodes 105 are implemented as respective host devices and are assumed to have persistent storage resources associated therewith. The host devices illustratively comprise servers or other types of computers of an enterprise computer system, cloud-based computer system or other arrangement of multiple compute nodes of a distributed computing system.

Other distributed computing systems can include different numbers and arrangements of compute nodes, and possibly one or more additional components. For example, a distributed computing system in some embodiments can comprise a system manager, which may be implemented on one of the compute nodes or on one or more separate nodes.

The compute nodes in some embodiments can interact with a storage array or other type of storage system over one or more networks. The storage system can comprise, for example, a distributed storage system that includes multiple storage nodes, although numerous other arrangements are possible.

The compute nodes 105 illustratively comprise respective processing devices of one or more processing platforms. For example, the compute nodes 105 can each comprise one or more processing devices each having a processor and a memory.

The compute nodes 105 may be implemented on a common processing platform, or on separate processing platforms.

In some embodiments, the compute nodes 105 are implemented using cloud infrastructure. For example, the compute nodes 105 may be configured to provide compute services for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The compute nodes 105 communicate with one another and with the coordination service 104 via one or more networks. A given such network in some embodiments is assumed to comprise a portion of a global computer network such as the Internet, although additional or alternative types of networks can be part of the network, including a wide area network (WAN), a local area network (LAN), a satellite network, a telephone or cable network, a cellular network such as 4G or 5G cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

In some embodiments, the compute nodes 105 of the distributed computing system 102 are interconnected with one another in a full mesh network.

As indicated previously, the compute nodes 105 collectively comprise an example of one possible implementation of a distributed computing system. The term "distributed computing system" as used herein is intended to be broadly construed, so as to encompass numerous other clusters of compute nodes. The term "compute node" as used herein is also intended to be broadly construed, so as to encompass, for example, one or more processing devices that additionally implement storage and network resources, in addition to compute resources utilized in execution of one or more distributed applications.

The compute nodes 105 illustratively provide various services through execution of processing tasks for one or more distributed applications. It is often necessary for the compute nodes 105 to collectively agree that one of them will serve as a leader with respect to one or more such processing tasks.

As indicated previously, a technical problem that arises in distributed computing systems is that conventional approaches typically require election of only a particular one of the nodes as a leader at any given time, which can lead to processing bottlenecks on the particular node that is currently elected as the leader. For example, in the Kubernetes context, load scaling can be achieved by simply adding more pods in a given deployment. Each such pod illustratively represents a node in a cluster and can run the same container image with the workload being evenly distributed among these nodes. However, if a leader is needed in such a deployment, then one of the pods would be acting as the leader, and it will run additional tasks which are assigned to the leader. Thus, the leader pod may become the performance bottleneck for the deployment. The external workload could be offloaded to additional pods, but the designated tasks for a leader could only be run on one pod.

In illustrative embodiments herein, the compute nodes 105 are advantageously configured to implement functionality for multi-leader election in the distributed computing system 102 through performance of a multi-leader election algorithm that involves interaction with the coordination service 104.

For example, some embodiments provide a technical solution to the above-noted technical problem by configuring the compute nodes 105 to cooperate with one another to elect multiple leaders for respective processing tasks in a manner that facilitates the balancing of the processing tasks across the compute nodes 105, leading to improved overall performance within the distributed computing system 102.

The disclosed arrangements advantageously avoid situations in which a single leader is overloaded by running a list of designated leader-only processing tasks. Instead of electing a single node as a leader to run all these processing tasks, illustrative embodiments allow multiple nodes to take on the responsibilities of these tasks through a multi-leader election algorithm performed by each of the nodes. In such arrangements, the leader responsibility is efficiently shared among the multiple nodes.

In some embodiments, a multi-leader election process is triggered when a node joins a cluster or leaves a cluster. After the process finishes, all running nodes have reached agreement on the election result.

Assume by way of example that T is the task number and N is the node number. In some embodiments, the multi-leader election algorithm is configured such that multiple leaders are assigned to different processing tasks as follows:
- if T=N, then each node is assigned as leader for one task;
- If T<N, then each node is assigned as leader for one or zero tasks; and
- If T>N, then each node is assigned as leader for int(T/N) or int(T/N)+1 tasks, where "int(·)" denotes the integer function.

Other types of task assignment can be provided in accordance with multi-leader election in other embodiments.

The multi-leader election algorithm in some embodiments illustratively ensures that tasks are substantially evenly assigned to available nodes, regardless of the number of tasks and the number of nodes. It can also handle scenarios in which the number of nodes are scaled up or scaled down.

As indicated previously, the compute nodes 105 of the distributed computing system 102 of FIG. 1 interact with the coordination service 104, and more particularly with one or more servers 106 of the coordination service 104, where the one or more servers 106 store participant identifier trees, election results trees and watch trees for use in multi-leader election performed by the compute nodes 105. Such trees are examples of what are more generally referred to herein as "data structures" maintained by the coordination service 104 for use in multi-leader election collaboratively carried out by the compute nodes 105. Other types of data structures can be used in other embodiments. The one or more servers 106 are examples of servers that are "external" to the distributed computing system 102. The term "external" in this context is intended to be broadly construed, so as to encompass, for example, a server that is accessible over a network to one or more of the compute nodes 105 of the distributed computing system 102 but is not implemented within those one or more compute nodes 105.

The compute nodes 105 implement their respective portions of the multi-leader election functionality utilizing respective instances of multi-leader election logic 112-1, 112-2, . . . 112-M, in combination with respective decision stacks 114-1, 114-2, . . . 114-M, within the respective compute nodes 105.

In operation, a given one of the compute nodes 105 establishes with the coordination service 104 a participant identifier for that node as a participant in a multi-leader election algorithm implemented in the distributed computing system 102. In some embodiments, the compute nodes 105 corresponding to participants having respective participant identifiers, although other arrangements are possible. The given compute node interacts with the coordination service 104 in performing an iteration of the multi-leader election algorithm to determine a current assignment of respective ones of the participants as leaders for respective processing tasks of the distributed computing system 102. It is assumed that each of the compute nodes 105 similarly performs such operations.

As noted above, the coordination service 104 via its one or more servers 106 maintains one or more data structures for the multi-leader election algorithm implemented in the distributed computing system 102.

Figure 3:
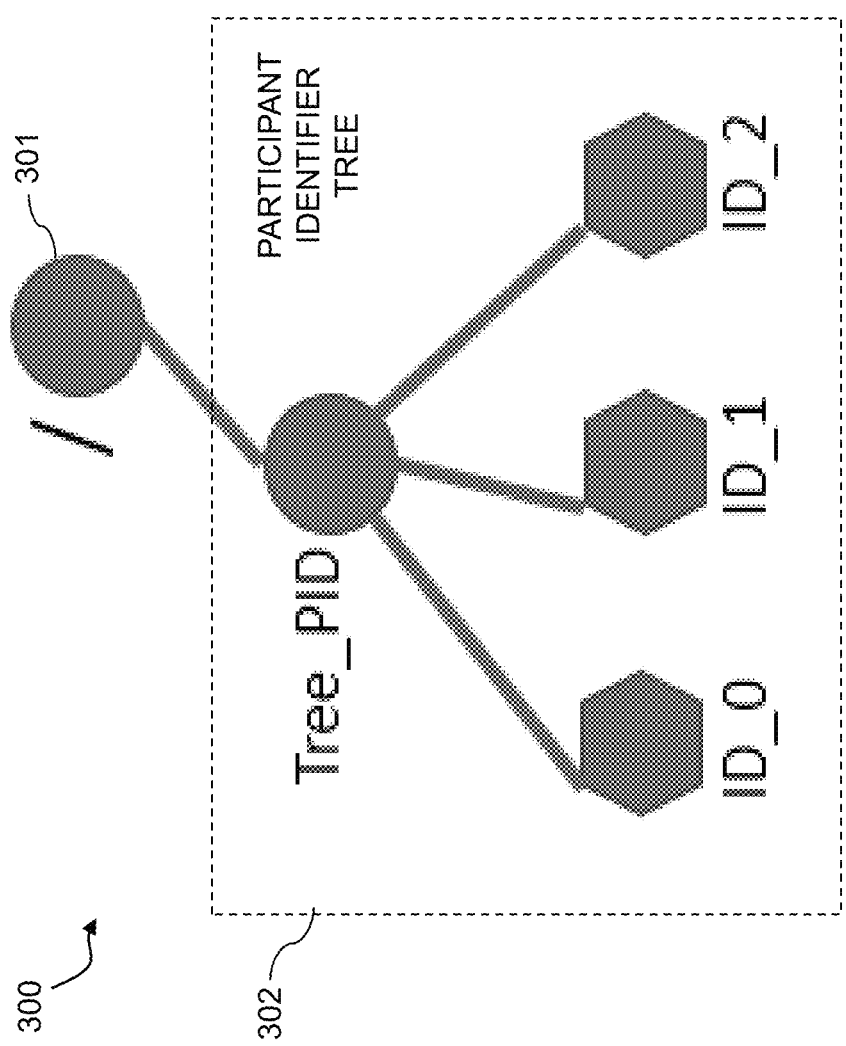
FIG. 3 shows an example of a participant identifier tree utilized in multi-leader election in an illustrative embodiment.
Figure 4:
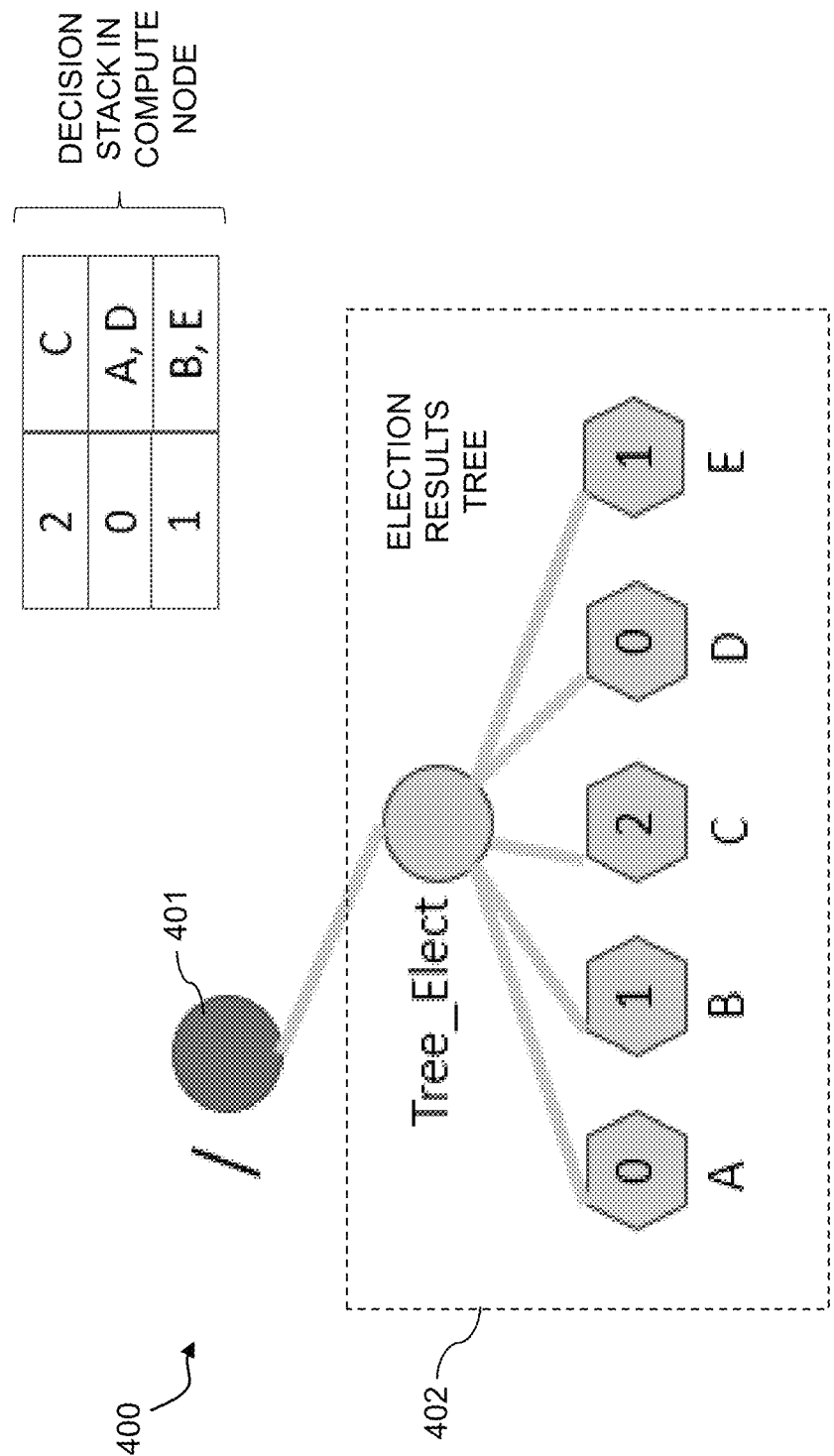
FIG. 4 shows an example of an election decision tree and associated decision stack data structure utilized in multi-leader election in an illustrative embodiment.

In some embodiments, the one or more data structures comprise at least a participant identifier tree and an election results tree, with the participant identifier tree comprising a plurality of leaf nodes for respective ones of the participant identifiers, as illustrated in the example of FIG. 3, and the election results tree comprising a plurality of leaf nodes indicating respective ones of the participants currently elected as leaders for respective ones of the processing tasks, as illustrated in the example of FIG. 4. These example participant identifier trees and election results trees are described in more detail elsewhere herein.

In some embodiments, the given compute node illustratively establishes with the coordination service 104 a participant identifier for that node as a given participant in the multi-leader election algorithm by requesting creation of a participant identifier tree node for the given participant as a sequential and ephemeral node, and receiving the participant identifier for the given participant in response to the request. Terms such as "request" and "requesting" as used in this context herein are intended to be broadly construed so as to encompass a wide variety of different arrangements through which a given compute node interacts with a coordination service to establish a participant identifier.

Additionally or alternatively, the given compute node illustratively interacts with the coordination service 104 in performing an iteration of the multi-leader election algorithm by obtaining values of participant identifier tree nodes and election results tree nodes from the coordination service 104, and utilizing the obtained values to maintain a stack data structure in which participants are sorted into entries of the stack data structure based at least in part on number of processing tasks for which they are assigned as leader. The decision stacks 114 of the compute nodes 105 are examples of such stack data structures. Another example of the stack data structure maintained by a given compute node is also shown in FIG. 4, and is described in more detail elsewhere herein.

Responsive to at least one of the processing tasks not currently having an assigned leader, the given compute node assigns a particular participant to a given one of the previously unassigned processing tasks based at least in part on a position of an entry for that participant in the stack data structure, updates the stack data structure and one or more corresponding values of the election results tree nodes with the coordination service, and repeats the assigning and updating until leaders are assigned to all of the processing tasks.

In some embodiments, each of at least a subset of the entries of the stack data structure comprises a participant identifier and information indicating one or more of the processing tasks for which the corresponding participant is assigned as a leader.

The entries of the stack data structure are illustratively organized in order of increasing number of processing tasks for which the corresponding participant is assigned as a leader, with a first one of the participants having a highest number of assigned processing tasks having a lowest entry in the stack data structure and a second one of the participants having a lowest number of assigned processing tasks having a highest entry in the stack data structure, with entry positioning for participants having a same number of assigned processing tasks being resolved utilizing their respective participant identifiers. It is to be appreciated that other types and configurations of stack data structures can be used.

In some embodiments, assigning a particular participant to a given one of the previously unassigned processing tasks based at least in part on a position of an entry for that participant in the stack data structure illustratively comprises assigning the participant having the highest entry in the stack data structure as the leader for the given processing task.

Additionally or alternatively, the given compute node is illustratively configured to rebalance assignment of tasks between participants responsive to detection of at least a threshold difference between respective numbers of processing tasks assigned to a first one of the participants having a highest number of assigned processing tasks and a second one of the participants having a lowest number of assigned processing tasks.

The rebalancing of assignment of tasks between participants illustratively comprises reassigning at least one of the processing tasks from the first participant to the second participant, and updating the stack data structure and one or more corresponding values of the election results tree nodes with the coordination service.

Figure 5:
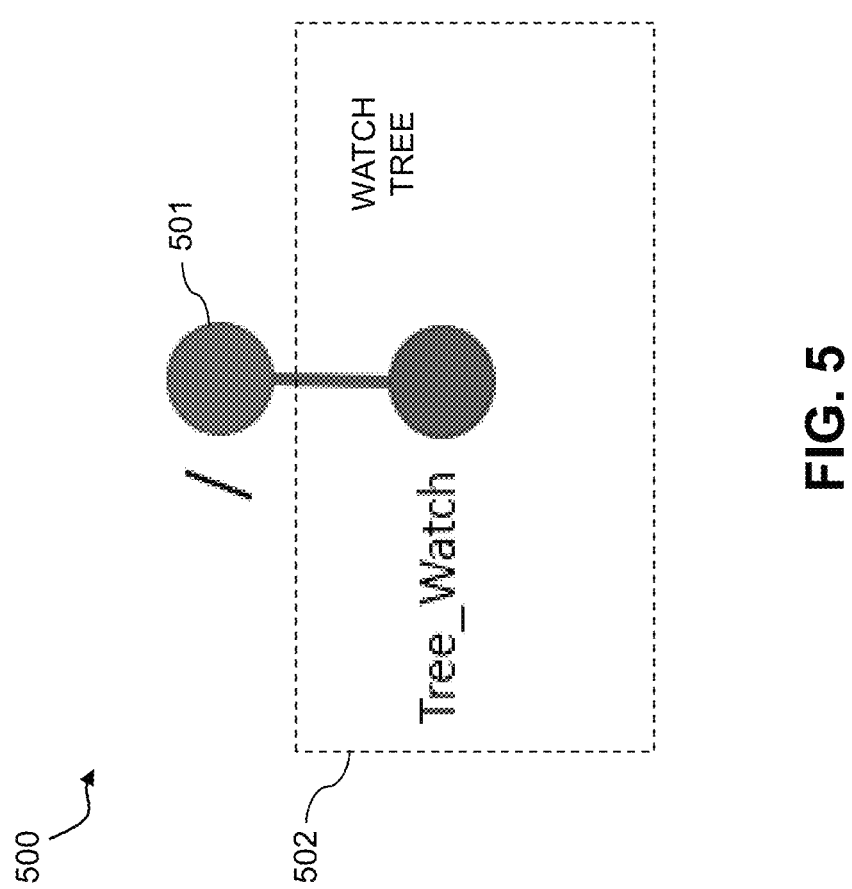
FIG. 5 shows an example of a watch tree utilized in multi-leader election in an illustrative embodiment.

In some embodiments, interacting with the coordination service in performing an iteration of the multi-leader election algorithm illustratively comprises establishing at least a portion of a watch loop among the participants in accordance with a watch utility of the coordination service 104, and utilizing the watch loop to detect departure of one or more of the participants from participation in the multi-leader election algorithm. An example of a watch tree based on a watch utility of the coordination service 104 is shown in FIG. 5 and described in more detail elsewhere herein.

The watch loop is illustratively configured based at least in part on participant identifiers with each participant monitoring another one of the participants adjacent to it in the watch loop in accordance with their respective participant identifiers. Other types of watch loops or participant departure mechanisms can be used in other embodiments.

The given compute node in some embodiments is further configured, for at least one of the distributed applications executed by the distributed computing system 102, to determine via the coordination service 104 whether or not a given participant is currently assigned as a leader for a particular one of the processing tasks, and responsive to an affirmative determination, to cause the given participant to perform the particular processing task.

The particular multi-leader election features and functionality described above in conjunction with FIG. 1 should not be construed as limiting in any way, and a wide variety of other distributed implementations of system components such as coordination service 104 and compute nodes 105 and their associated multi-leader election logic 112 and corresponding decision stacks 114 are possible.

The compute nodes 105 of the example distributed computing system 102 illustrated in FIG. 1 are assumed to be implemented using at least one processing platform, with each such processing platform comprising one or more processing devices, and each such processing device comprising a processor coupled to a memory. Such processing devices can illustratively include particular arrangements of compute, storage and network resources.

Alternatively, the compute nodes 105 may be implemented on respective distinct processing platforms, although numerous other arrangements are possible. For example, different subsets of the compute nodes 105 can be implemented on respective different processing platforms.

Similarly, the coordination service 104 is illustratively implemented using one or more processing platforms that implement the one or more servers 106 configured to store the participant identifier trees, election results trees, watch trees and/or additional or alternative data structures for use in multi-leader election.

The term "processing platform" as used herein is intended to be broadly construed so as to encompass, by way of illustration and without limitation, multiple sets of processing devices and associated storage systems that are configured to communicate over one or more networks. For example, certain components of the system 100 can reside in one data center in a first geographic location while other components of the system 100 reside in one or more other data centers in one or more other geographic locations that are potentially remote from the first geographic location. Thus, it is possible in some implementations of the system 100 for different subsets of the compute nodes 105 to reside in different data centers. Numerous other distributed implementations of the compute nodes 105 and the one or more servers 106 of the coordination service 104 are possible in other embodiments.

Additional examples of processing platforms utilized to implement distributed computing systems and possibly an associated coordination service in illustrative embodiments will be described in more detail below in conjunction with FIGS. 13 and 14.

It is to be appreciated that these and other features of illustrative embodiments are presented by way of example only, and should not be construed as limiting in any way.

Accordingly, different numbers, types and arrangements of system components such as distributed computing system 102, coordination service 104 and compute nodes 105 can be used in other embodiments.

It should be understood that the particular sets of modules and other components implemented in a distributed computing system as illustrated in FIG. 1 are presented by way of example only. In other embodiments, only subsets of these components, or additional or alternative sets of components, may be used, and such components may exhibit alternative functionality and configurations.

For example, in other embodiments, certain portions of multi-leader election functionality as disclosed herein can be implemented across multiple processing devices of one or more of the compute nodes 105.

The operation of the information processing system 100 will now be described in further detail with reference to the flow diagram of the illustrative embodiment of FIG. 2, which implements a process for implementing multi-leader election in a distributed computing system. This process may be viewed as comprising an example multi-leader election algorithm performed at least in part by the compute nodes 105 of the distributed computing system of FIG. 1. For example, such an algorithm is illustratively carried out at least in part utilizing one or more instances of multi-leader election logic 112 in respective ones of the compute nodes 105. These and other algorithms disclosed herein are more generally applicable to a wide variety of other distributed computing systems each comprising two or more compute nodes.

Figure 2:
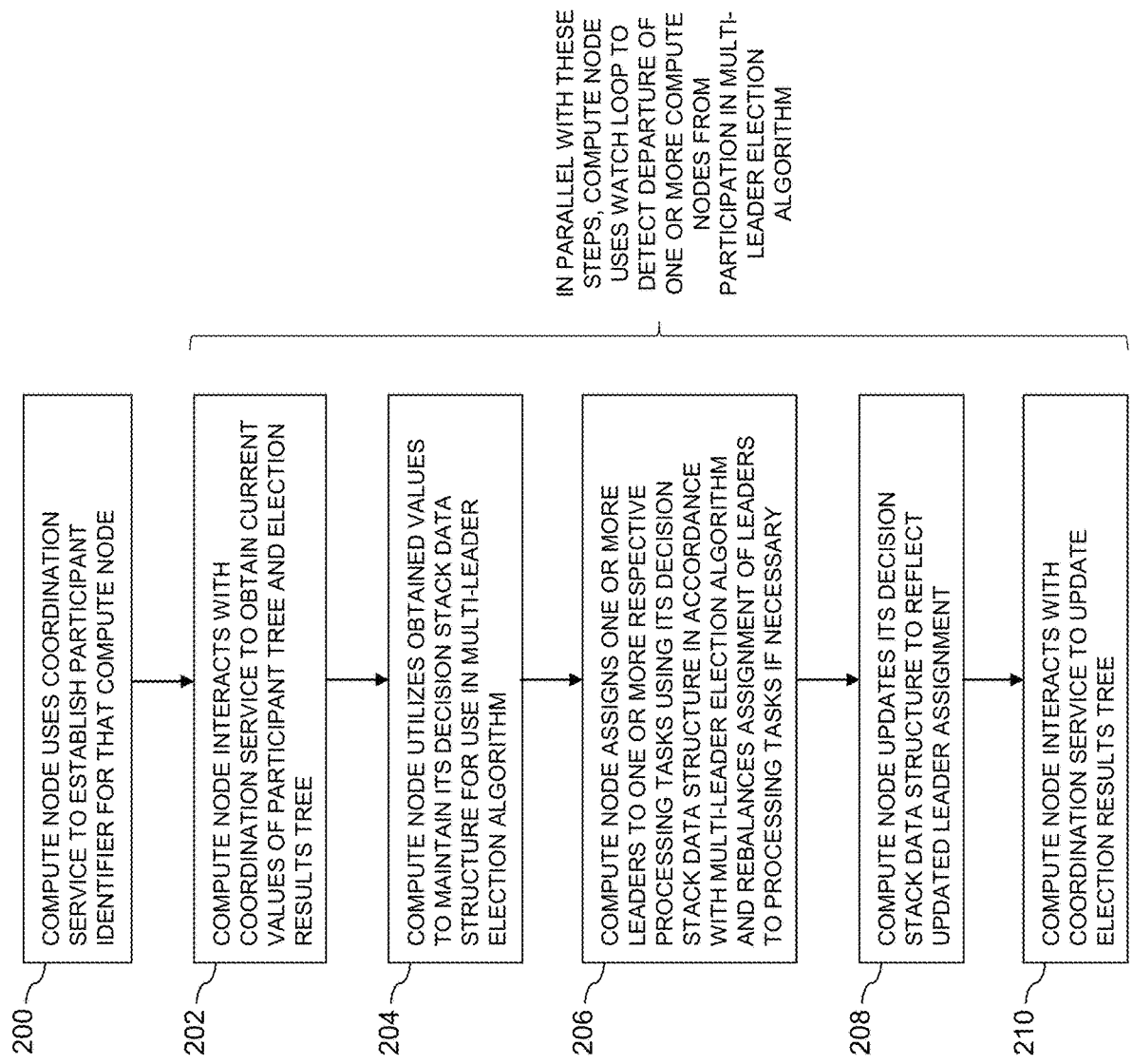
FIG. 2 is a flow diagram of an example process for multi-leader election in an illustrative embodiment.

Referring now to FIG. 2, the multi-leader election process as illustrated includes steps 200 through 210, and is illustratively performed by a given one of the compute nodes 105, but it is assumed that each of the other compute nodes 105 similarly performs the process such that the compute nodes 105 collectively implement multi-leader election in the distributed computing system 102. For example, different instances of the multi-leader election process are illustratively performed at least in part in parallel by different ones of the compute nodes 105, so as to permit the compute nodes 105 to collaborate with one another in implementing multi-leader election functionality within the distributed computing system 102.

In step 200, a given one of the compute nodes 105 uses the coordination service 104 to establish a participant identifier for that compute node.

In step 202, the compute node interacts with the coordination service to obtain current values of a participant tree and an election results tree, examples of which are shown in FIGS. 3 and 4 respectively.

In step 204, the compute node utilizes the obtained values to maintain its decision stack data structure for use in conjunction with performing its instance of a multi-leader election algorithm.

In step 206, the compute node assigns one or more leaders to one or more processing tasks, using its decision stack data structure and in accordance with the multi-leader election algorithm. The compute node also rebalances assignment of leaders to processing tasks if necessary.

In step 208, the compute node updates its decision stack data structure to reflect the updated leader assignment.

In step 210, the compute node interacts with the coordination service to update the election results tree.

In parallel with steps 202 through 210, the compute node uses a watch loop, illustratively implemented at least in part via a watch utility of the coordination service, to detect departure of one or more other compute nodes from participation in the multi-leader election algorithm.

At least portions of steps 200 through 210 are illustratively repeated for multiple iterations by each of the compute nodes of the distributed computing system. Such an arrangement allows the compute nodes to collaborate with one another to implement multi-leader election functionality within the distributed computing system.

The steps of the FIG. 2 process are shown in sequential order for clarity and simplicity of illustration only, and certain steps can at least partially overlap with other steps. Additional or alternative steps can be used in other embodiments.

The particular processing operations and other system functionality described in conjunction with the flow diagram of FIG. 2 are presented by way of illustrative example only, and should not be construed as limiting the scope of the disclosure in any way. Alternative embodiments can use other types of processing operations for implementing multi-leader election in a distributed computing system. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a multi-leader election across multiple compute nodes within a distributed computing system.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

A compute node can be implemented as part of what is more generally referred to herein as a processing platform comprising one or more processing devices each comprising a processor coupled to a memory.

A given such processing device in some embodiments may correspond to one or more virtual machines or other types of virtualization infrastructure such as Docker containers or Linux containers (LXCs). Host devices, storage controllers and other system components may be implemented at least in part using processing devices of such processing platforms. For example, respective logic instances, data structures or other processing modules of a compute node can be implemented in respective containers running on respective ones of the processing devices of a processing platform.

Examples of the above-noted participant identifier tree, election results tree and watch tree maintained by the coordination service 104 will now be described below in conjunction with FIGS. 3, 4 and 5, respectively. FIG. 4 also includes an example of the above-noted decision stack data structure maintained by a given one the compute nodes 105.

In these examples, it is assumed without limitation that the coordination service 104 is implemented using Apache ZooKeeper to synchronize election-related data between the compute nodes 105, although other types of coordination services can be used. As indicated previously, ZooKeeper is an open-source coordination service for distributed applications. ZooKeeper allows distributed processes to coordinate with each other through a shared hierarchical namespace which is organized in a manner similar to a standard file system, and utilizes data structures commonly referred to as "znodes." A user can create a znode and access it via a root node of a hierarchical tree data structure in a manner similar to a file system. Each znode can also have one or more corresponding values, possibly set by a user. The znode illustratively denotes a node created in a ZooKeeper hierarchical tree. Znodes are therefore also referred to herein as "nodes" but are not to be confused with compute nodes of a distributed computing system.

An entity participating in a multi-leader election algorithm is generally referred to herein as a "participant." For example, each of the compute nodes 105 is illustratively a participant in a multi-leader election algorithm carried out within the distributed computing system 102 via interaction with coordination service 104. Other types of participants can be designated in other embodiments. For example, a particular thread or process of a given compute node can be a participant in other embodiments.

As indicated previously, illustrative embodiments to be described below utilize ZooKeeper to synchronize information between participants, and make use of the following three features provided by ZooKeeper:

Sequential. When creating a znode, it may be set as "sequential." ZooKeeper will add a suffix i to the znode where i is an integer number. Once such a znode is created, the sequential number will be incremented by one. For example, if one participant creates a sequential node named P_, ZooKeeper will create a node P_0. If another participant creates another sequential node named P_, Zookeeper will create a node P 1.

Ephemeral. A participant can also create a znode as "ephemeral." If the session between the participant and a ZooKeeper server expires then ZooKeeper will automatically remove the znode. Such a session expiration event may be caused, for example, by a compute node crash, or by the participant choosing to quit.

Watcher. A participant can set a watch function on a znode. This function will be called when there is any change on that znode. Possible changes include znode value updates, or the znode being deleted.

As mentioned previously, in some embodiments the coordination service 104 maintains various types of data structures utilized in multi-leader election, illustratively including participant identifier trees, election results trees and watch trees, examples of which are shown in respective FIGS. 3, 4 and 5. Such trees are also referred to as sub-trees, as they illustratively share a common root node of a ZooKeeper hierarchical tree.

Referring now to FIG. 3, a data structure 300 comprises a root node 301 and a participant identifier tree 302 under the root node 301. The participant identifier tree in this example is denoted Tree_PID. When any participant starts up, it interacts with the coordination service 104 to create a node named ID_ under this tree, with both sequential and ephemeral set. In the FIG. 3 example, there are three participants that have created such a node in Tree_PID, resulting in three leaf nodes having respective sequential values ID_0, ID_1 and ID_2. These are the identifiers or PIDs of the respective participants. Since the auto-generated sequential number is unique, each participant can read this number and use it as an ID number for itself in the multi-leader election process.

As shown in FIG. 4, a data structure 400 comprises a root node 401 and an election results tree 402 under the root node 401. The election results tree in this example is denoted Tree_Elect. Although shown as a separate root node in the figure, the root node 401 is illustratively the same as the root node 301, such that both Tree_PID of FIG. 3 and Tree_Elect of FIG. 4 are sub-trees of the same root node. The leaf nodes of Tree_Elect illustratively store the leader election results for respective processing tasks, with the znode name representing a particular processing task and the znode value being the ID number of a participant currently assigned as leader for that task. In the FIG. 4 example, it is again assumed that there are three participants having respective participant identifiers ID_0, ID_1 and ID_2, abbreviated as 0, 1 and 2, respectively. Each participant can perform a lookup of Tree_Elect via the coordination service 104 to determine the current election results. This tree will also be updated to reflect the latest leader election decisions after completion of the multi-leader election process.

It is further assumed in the FIG. 4 example that there are five tasks A, B, C, D and E for which leaders need to be elected, from among the three participants 0, 1 and 2 in the election process. The figure shows the updated tree after completion of the multi-leader election process. In this example, participant 0 is elected as the leader for tasks A and D, participant 1 is elected as the leader for tasks B and E, and participant 2 is elected as the leader for task C.

Also shown in FIG. 4 is an example decision stack used by a given one of the compute nodes as part of the multi-leader election process. The decision stack in this example is also referred to herein as S_elect. A participant performing the multi-leader election process will use the decision stack S_elect in making its election decisions. It is populated and updated by looking up Tree_PID and Tree_Elect during the multi-leader election process.

The decision stack S_elect is illustratively generated using the following rule, although additional or alternative rules can be used. Participants are sorted by the number of tasks for which they are currently assigned as leader. The participant with the most tasks is sorted towards the bottom of the stack. If multiple participants each have the same number of tasks, then they are further sorted by their respective ID numbers, with higher ID numbers being sorted towards the bottom of the stack. The stack also keeps a list of assigned tasks for each participant. A given entry in the stack therefore comprises a participant ID and a listing of the processing tasks, if any, for which that participant is currently assigned as leader.

An example multi-leader election process using the above-described trees and decision stack is illustratively configured, when any processing task needs to have a leader assigned thereto, to choose the top participant from the stack S_elect as the candidate, since it has the least tasks assigned to it. If multiple participants have been qualified by the above rule, then the participant who has the lowest ID number wins. Also, the multi-leader election process rebalances the tasks between participants, until the tasks are evenly distributed among the participants. Each participant is assumed to perform the multi-leader election process at start-up of that participant, although it could additionally or alternatively be performed under other conditions.

The multi-leader election process in this example includes the following steps, although additional or alternative steps could be used:

Step 1: create znode ID_ in tree Tree_PID, set it as both sequential and ephemeral.

Step 2: retrieve the number from the automatically generated znode name ID_n, save this number n as ID of the participant.

Step 3: create a list L1 based on information of Tree_Elect:

L1: tasks which are not yet been assigned leaders

Step 4: lookup Tree_PID and Tree_Elect. Create stack S_elect by using the tree information.

Step 5: if L1 is empty, go to step 6. Else:
   for task_i in L1:

```
{
   assign top participant in S_elect as leader of task_i
   update Tree_Elect
   recreate S_elect based on Tree_PID and Tree_Elect
}
Step 6: re-balance tasks between participants:
   while (True):
   {
      t_diff = (task number of bottom participant) –
      (task number of top participant)
      if (t_diff <= 1):
         finish election process
      else:
      {
         move first task from bottom participant to top participant
         update Tree_Elect
         recreate S_elect based on Tree_PID and Tree_Elect
      }
   }
```

Again, this particular multi-leader election process is presented by way of illustrative example only, and should not be construed as limiting in any way.

As mentioned previously, some embodiments utilize a watch loop to handle situations in which a participant leaves the cluster.

FIG. 5 shows a data structure 500 comprising a root node 501 and a watch tree 502 under the root node 501. The watch tree is also denoted as Tree_Watch. It has only a single node, as shown in the figure.

This embodiment utilizes the watch utility of ZooKeeper to create a watch loop so that a crash, failure, departure or other leave event of any participant will be detected by another participant. The watch loop is illustratively formed such that each participant is watching another participant which has the closest lower ID number, and the participant with the lowest ID number watches the one with the highest ID number.

The loop is updated each time a participant starts. The steps in an example watch loop update process performed by a given participant are as follows, although additional or alternative steps could be used:
   Step 1: participant learns ID numbers of all running participants by checking znodes created under Tree_PID. Let i be the ID number of this participant.
   Step 2: find a number j, where j is the largest number such that j<i.
   Step 3: if j exists, then set watch on znode ID_j and update znode Tree_Watch. Else, this participant is the only running one in the cluster, set watch on Tree_Watch.

From Step 3, it is apparent that the participant with the lowest ID number will be notified when a new participant starts up. Upon receiving this notification the participant with the lowest ID number will perform the following steps, although again additional or alternative steps can be used:
   Step 1: get its current watch ID p and the largest ID q among all participants.
   Step 2: if p exists, then stop watching p.
   Step 3: set watch on q.

Since each znode under Tree_PID is set as ephemeral, it will be automatically deleted when the ZooKeeper session between participant and server disconnects, which means the participant has left the cluster.

Let p be the participant who leaves the cluster, with q being the watcher of p, then q will do the following upon receiving notification:

Step 1: update Tree_Elect. For any task whose leader is p, now mark its leader as NULL.
   Step 2: start election process.
   Step 3: reform the watch loop. If q is the lowest number, then set watch on the highest ID number and Tree_Watch. Else set watch on participant j, where j is the largest number such that j<q.

A detailed example of an illustrative process for implementing at least some of the above-described multi-leader election functionality will now be described in conjunction with the diagrams of FIGS. 6 through 12.

In this example, it is assumed that there are five tasks A, B, C, D and E, and five participants 0, 1, 2, 3 and 4 that join the cluster in sequence over time, starting with participant 0. The description below shows how the multi-leader election result is updated each time a new participant joins the cluster, and also shows how the multi-leader election result is updated when a participant leaves the cluster.

Figure 6:
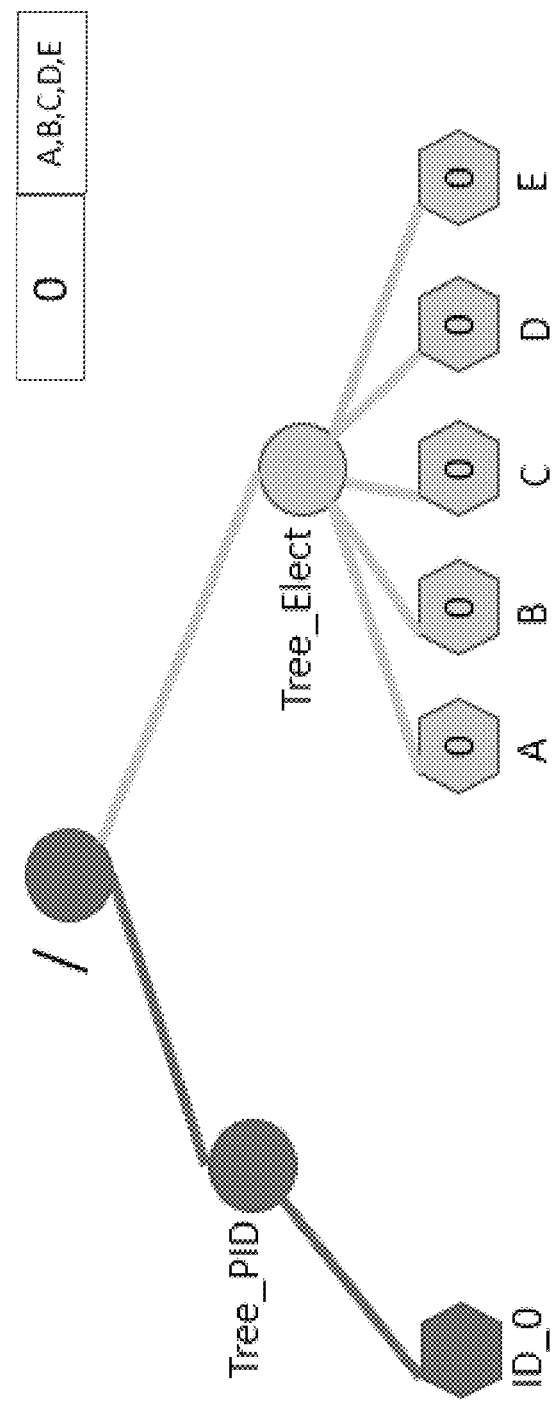
FIGS. 6 through 12 illustrate the operation of an example multi-leader election process using participant identifier trees, election decision trees and associated decision stack data structures in an illustrative embodiment.

FIG. 6 illustrates the Tree_PID and Tree_Elect trees and the decision stack after participant 0 joins the cluster and executes an iteration of the multi-leader election algorithm, resulting in participant 0 being assigned as leader on all tasks, as there are no other participants in the cluster at this time.

Figure 7:
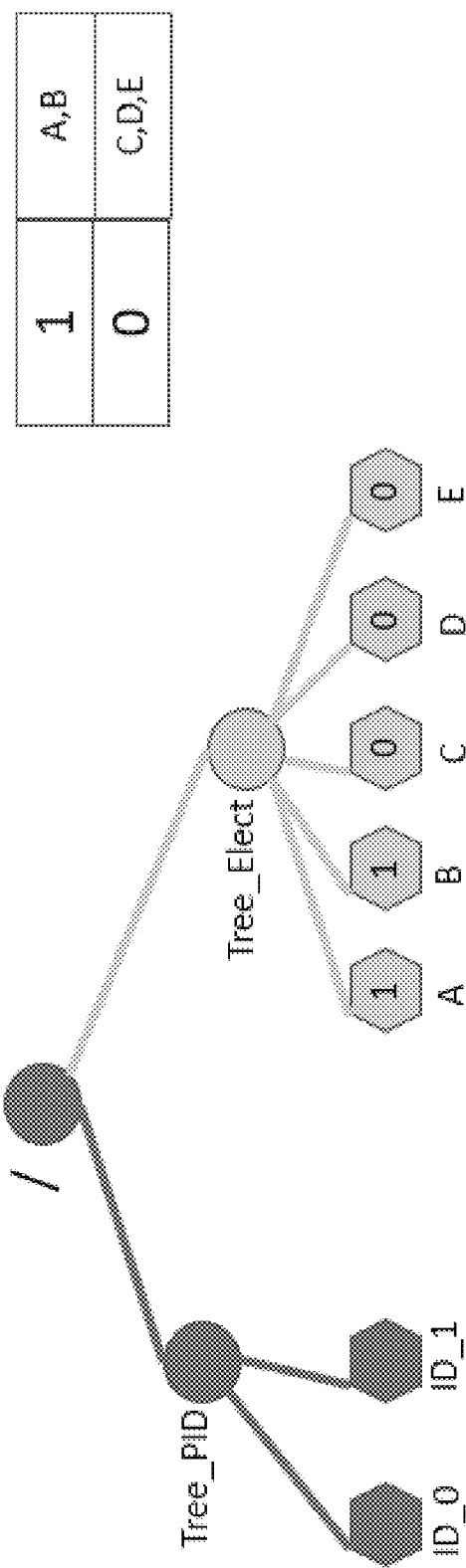

FIG. 7 shows the updated Tree_PID and Tree_Elect trees and the decision stack after participant 1 joins the cluster and executes an iteration of the multi-leader election algorithm, resulting in participant 1 being assigned as leader on tasks A and B, and participant 0 remaining assigned as leader on tasks C, D and E. Participant 1 thus takes over tasks from participant 0 until the task number difference between participants 1 and 0 is equal to 1, which occurs after participant 1 takes tasks A and B.

Figure 8:
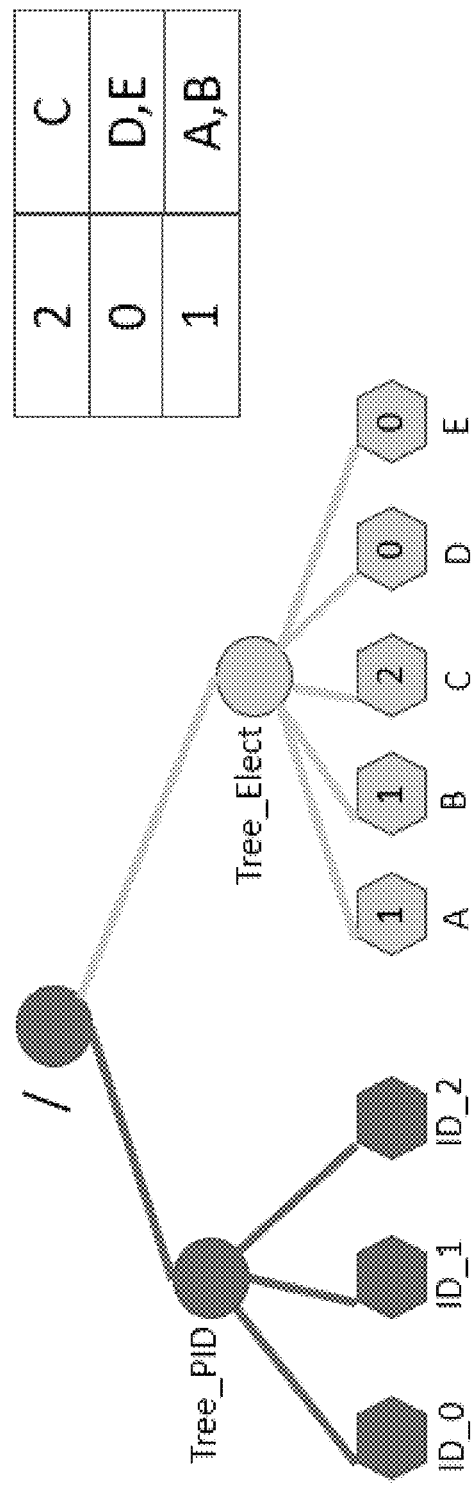

FIG. 8 shows the updated Tree_PID and Tree_Elect trees and the decision stack after participant 2 joins the cluster and executes an iteration of the multi-leader election algorithm, resulting in participant 2 being assigned as leader on task C, participant 0 remaining assigned as leader on tasks D and E, and participant 1 remaining assigned as leader on tasks A and B. In this iteration of the multi-leader election algorithm, participant 2 takes over task C from participant 0, and at that point the task number difference between the top and bottom participants in the decision stack is equal to 1 and so the iteration ends.

Figure 9:
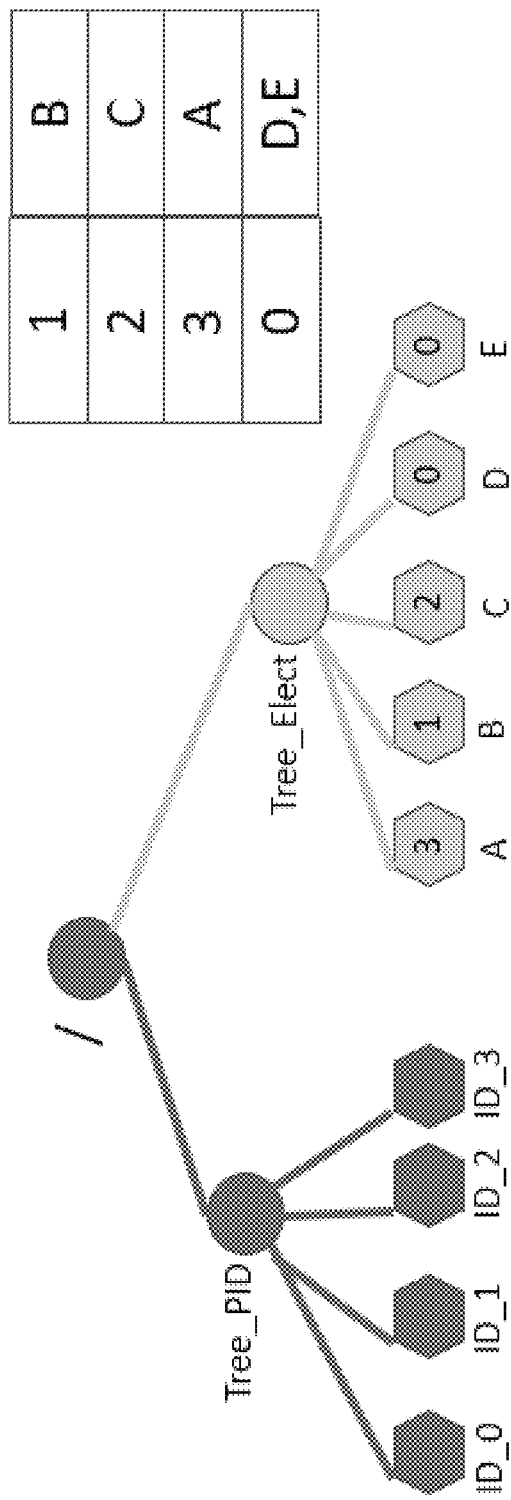

FIG. 9 shows the updated Tree_PID and Tree_Elect trees and the decision stack after participant 3 joins the cluster and executes an iteration of the multi-leader election algorithm, resulting in participant 3 being assigned as leader on task A, participant 0 remaining assigned as leader on tasks D and E, participant 1 remaining assigned as leader on task B, and participant 2 remaining assigned as leader on task C. In this iteration of the multi-leader election algorithm, participant 3 takes over task A from participant 1, and at that point the task number difference between the top and bottom participants in the decision stack is equal to 1 and so the iteration ends.

Figure 10:
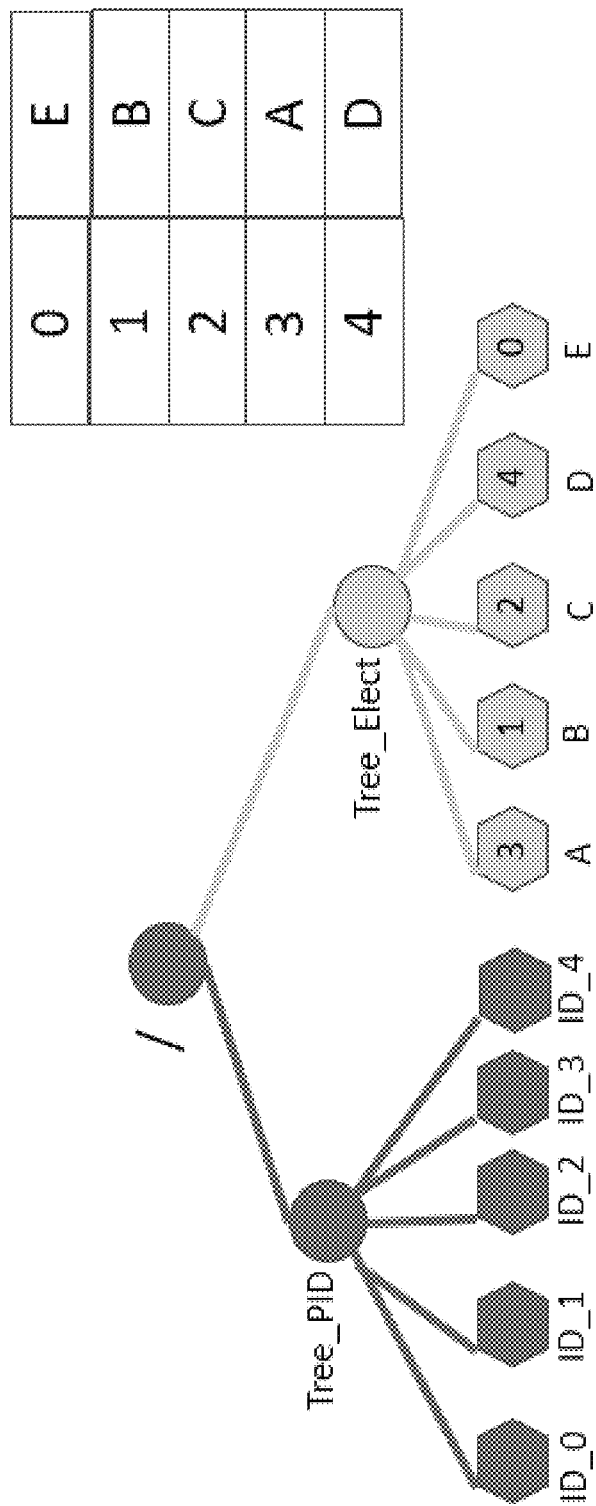

FIG. 10 shows the updated Tree_PID and Tree_Elect trees and the decision stack after participant 4 joins the cluster and executes an iteration of the multi-leader election algorithm, resulting in participant 4 being assigned as leader on task D, participant 0 remaining assigned as leader on task E, participant 1 remaining assigned as leader on task B, participant 2 remaining assigned as leader on task C, and participant 3 remaining assigned as leader on task A. In this iteration of the multi-leader election algorithm, participant 4 takes over task D from participant 0, and at that point the task number difference between the top and bottom participants in the decision stack is equal to 0 and so the iteration ends.

Assume at this point in the example that participant 3 crashes. Since participant 4 watches participant 3 in the watch loop, it will get notified and start an iteration of the multi-leader election algorithm.

Figure 11:
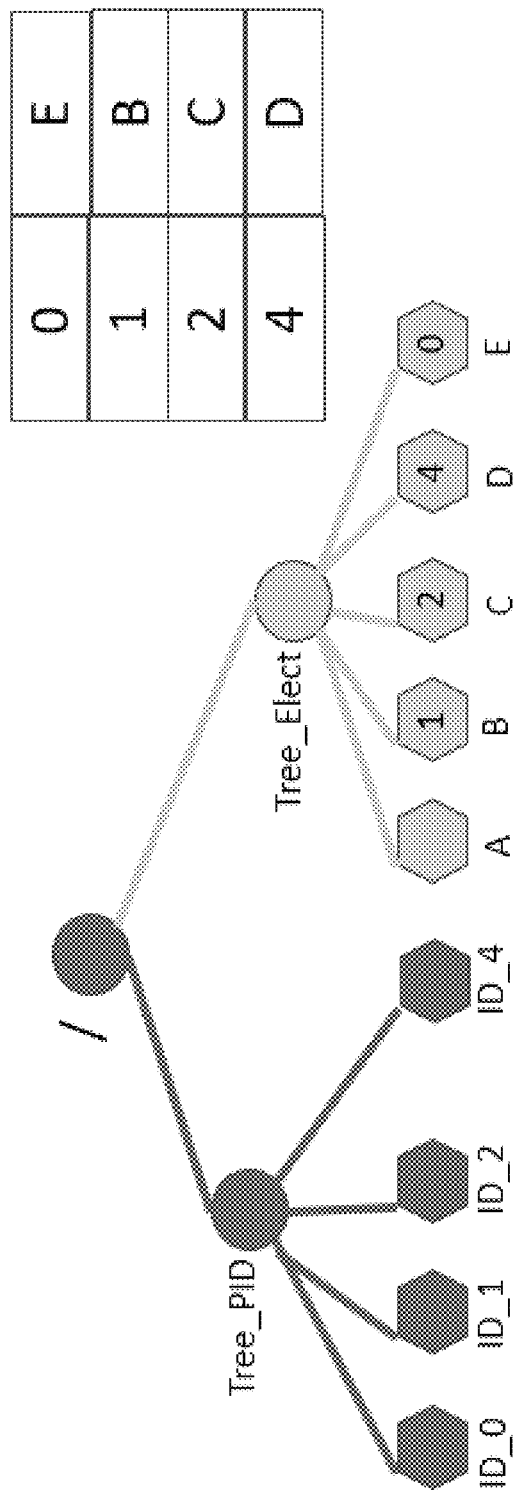

FIG. 11 illustrates the situation when participant 3 crashes, fails or is otherwise no longer able to participate, responsive to which its corresponding znode is removed from Tree_PID, and there is no longer any leader assigned for task A in Tree_Elect and the decision stack. This situation is detected by participant 4 utilizing the watch loop.

Since task A now does not have an assigned leader, the iteration of the multi-leader election algorithm initiated by participant 4 will first determine which of the remaining participants is going to be the leader for task A. Based on the illustrative rule described previously, the top participant in the decision stack is the most qualified one to take over a new task, with ties going to the lower participant ID, and so participant 0 will win and be assigned as leader for task A.

Figure 12:
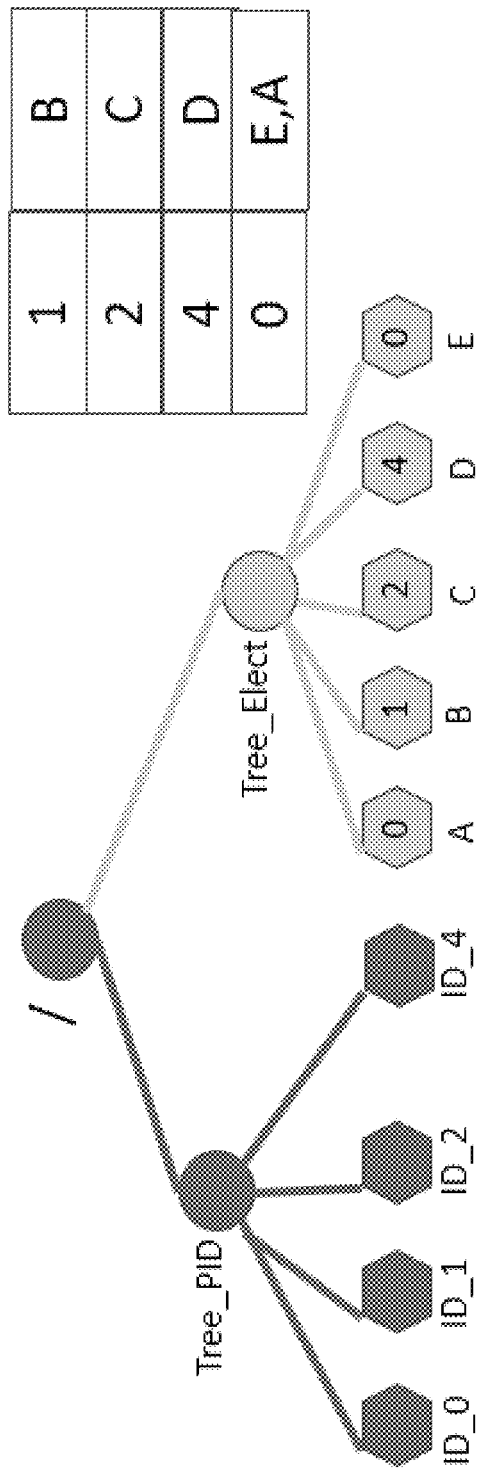

FIG. 12 shows the updated Tree_PID and Tree_Elect trees and the decision stack after participant 4 executes the iteration of the multi-leader election algorithm, resulting in participant 0 being assigned as leader on task A and remaining assigned as leader on task E. Participant 1 remains assigned as leader on task B, participant 2 remains assigned as leader on task C, and participant 4 remains assigned as leader on task D. In this iteration of the multi-leader election algorithm, participant 0 takes over task A from failed participant 3, and at that point the task number difference between the top and bottom participants in the decision stack is equal to 1 and so the iteration ends. Also, participant 4 will now start to watch participant 2 in accordance with the updated watch loop.

As indicated previously, multi-leader election of the type disclosed herein is illustratively utilized by one or more distributed applications executing on the compute nodes 105 of the distributed computing system 102.

In some embodiments, it is up to the application to determine when and how to utilize the election result. For example, if a distributed application is running a set of tasks, with one or more such tasks each running periodically as a background job, a compute node may control execution of a given such task as follows:

```
while (True):
{
  perform task i action
  sleep(n_sec)
}
```

In order to utilize the results of the multi-leader election process, the application can modify the above-described execution control in the following manner:

```
while (True):
{
  if (isLeaderofTask(i)==True):
  {
    perform task i action
  }
  sleep(n_sec)
}
```

The function isLeaderofTask(i) can be implemented by the compute node checking Tree_Elect, using its participant ID to determine if it is assigned as the leader for task i.

It is to be appreciated that the particular example algorithm described above and illustrated by the diagrams of FIGS. 6 through 12 is presented by way of illustration only, and should not be construed as limiting in any way. Additional or alternative steps can be used, and the ordering of the steps can vary in other embodiments, possibly with each of one or more steps being performed at least in part in parallel with one or more other steps.

These and other embodiments disclosed herein provide significant advantages over conventional approaches.

For example, illustrative embodiments provide techniques for multi-leader election in a distributed computing system. Such techniques in some embodiments configure multiple nodes of a cluster to cooperate with one another to elect multiple leaders for respective processing tasks in a manner that facilitates the balancing of the processing tasks across the nodes, leading to improved overall performance within the distributed computing system.

In some embodiments, each participant implements the same multi-leader election code via its instance of multi-leader election logic, thereby greatly simplifying the deployment effort for implementation of multi-leader election functionality in a distributed computing system. Moreover, the distributed computing system can easily scale up and down to more or fewer compute nodes in a given deployment without any significant additional effort or impact on the compute nodes.

In illustrative embodiments, a multi-leader election algorithm is provided that does not require any modification regardless of the number of participants and tasks. It is advantageously configured in some embodiments to always make sure that tasks are evenly distributed among available participants.

By leveraging ZooKeeper or other coordination services to provide participant identifier trees, election results trees, watch trees and/or other data structures for use in multi-leader election, illustrative embodiments facilitate interaction between the compute nodes of a distributed computing system for leader election, while providing convenient, reliable and high-performance access to the needed information.

Illustrative embodiments advantageously allow better utilization of the available processing resources of each node and thereby improves the overall system performance.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement host devices and distributed computing systems with multi-leader election functionality will now be described in greater detail with reference to FIGS. 13 and 14. Although described in the context of system 100, these platforms may also be used to implement at least portions of other information processing systems in other embodiments.

Figure 13:
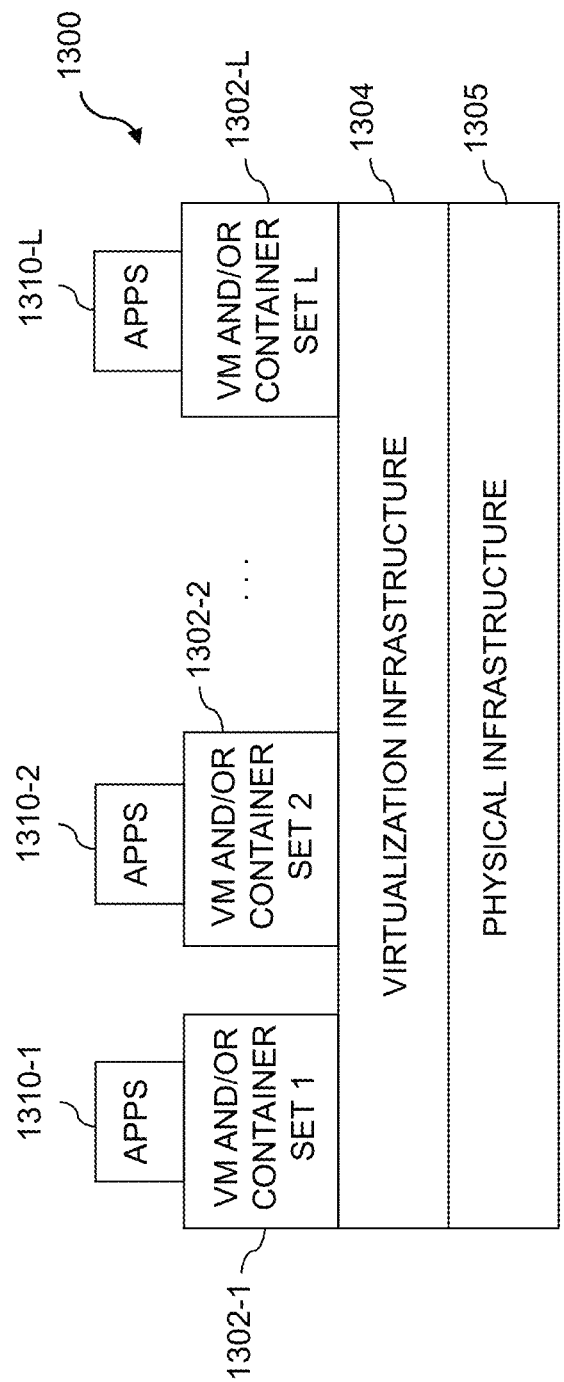
FIGS. 13 and 14 show examples of processing platforms that may be utilized to implement at least a portion of an information processing system in illustrative embodiments.
Figure 14:
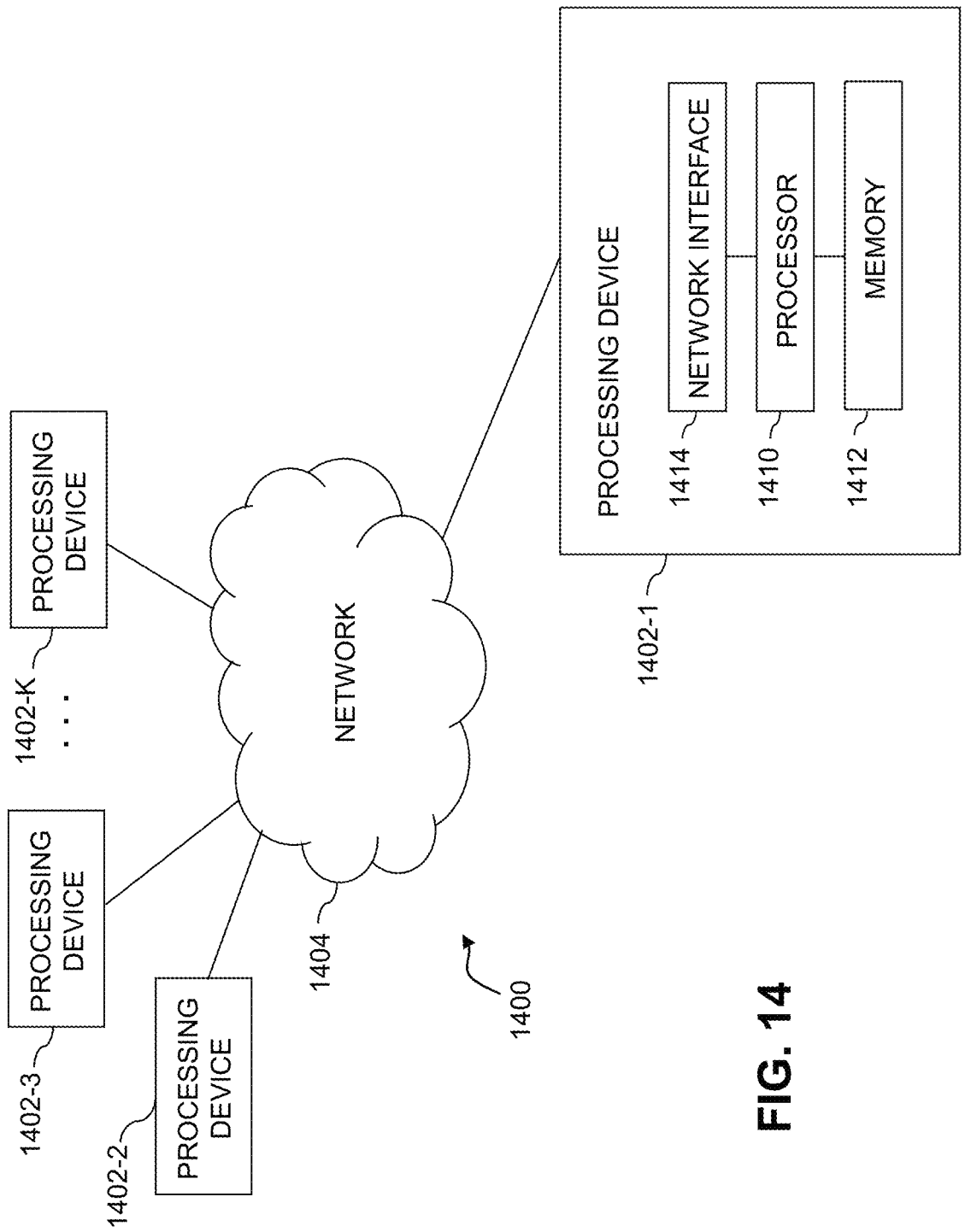

FIG. 13 shows an example processing platform comprising cloud infrastructure 1300. The cloud infrastructure 1300 comprises a combination of physical and virtual processing resources that may be utilized to implement at least a portion of the information processing system 100. The cloud infrastructure 1300 comprises multiple virtual machines (VMs) and/or container sets 1302-1, 1302-2, . . . 1302-L implemented using virtualization infrastructure 1304. The virtualization infrastructure 1304 runs on physical infrastructure 1305, and illustratively comprises one or more hypervisors and/or operating system level virtualization infrastructure. The operating system level virtualization infrastructure illustratively comprises kernel control groups of a Linux operating system or other type of operating system.

The cloud infrastructure 1300 further comprises sets of applications 1310-1, 1310-2, 1310-L running on respective ones of the VMs/container sets 1302-1, 1302-2, . . . 1302-L under the control of the virtualization infrastructure 1304. The VMs/container sets 1302 may comprise respective VMs, respective sets of one or more containers, or respective sets of one or more containers running in VMs.

In some implementations of the FIG. 13 embodiment, the VMs/container sets 1302 comprise respective VMs implemented using virtualization infrastructure 1304 that comprises at least one hypervisor. Such implementations can provide multi-leader election functionality in a distributed computing system of the type described above using one or more processes running on a given one of the VMs. For example, each of the VMs can implement logic instances, data structures and/or other components for implementing functionality associated with multi-leader election in the system 100.

A hypervisor platform may be used to implement a hypervisor within the virtualization infrastructure 1304. Such a hypervisor platform may comprise an associated virtual infrastructure management system. The underlying physical machines may comprise one or more distributed processing platforms that include one or more storage systems.

In other implementations of the FIG. 13 embodiment, the VMs/container sets 1302 comprise respective containers implemented using virtualization infrastructure 1304 that provides operating system level virtualization functionality, such as support for Docker containers running on bare metal hosts, or Docker containers running on VMs. The containers are illustratively implemented using respective kernel control groups of the operating system. Such implementations can also provide multi-leader election functionality in a distributed computing system of the type described above. For example, a container host device supporting multiple containers of one or more container sets can implement logic instances, data structures and/or other components for implementing multi-leader election functionality in the system 100.

As is apparent from the above, one or more of the processing devices or other components of system 100 may each run on a computer, server, storage device or other processing platform element. A given such element may be viewed as an example of what is more generally referred to herein as a "processing device." The cloud infrastructure 1300 shown in FIG. 13 may represent at least a portion of one processing platform. Another example of such a processing platform is processing platform 1400 shown in FIG. 14.

The processing platform 1400 in this embodiment comprises a portion of system 100 and includes a plurality of processing devices, denoted 1402-1, 1402-2, 1402-3, . . . 1402-K, which communicate with one another over a network 1404.

The network 1404 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1402-1 in the processing platform 1400 comprises a processor 1410 coupled to a memory 1412.

The processor 1410 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 1412 may comprise random access memory (RAM), read-only memory (ROM), flash memory or other types of memory, in any combination. The memory 1412 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1402-1 is network interface circuitry 1414, which is used to interface the processing device with the network 1404 and other system components, and may comprise conventional transceivers.

The other processing devices 1402 of the processing platform 1400 are assumed to be configured in a manner similar to that shown for processing device 1402-1 in the figure.

Again, the particular processing platform 1400 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise various arrangements of converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the multi-leader election functionality provided by one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, distributed computing systems, coordination services, compute nodes, multi-leader election logic instances, data structures and other components. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to establish with a coordination service for one or more distributed applications a participant identifier for a given participant in a multi-leader election algorithm implemented in a distributed computing system comprising multiple compute nodes, the compute nodes corresponding to participants having respective participant identifiers; and
to interact with the coordination service in performing an iteration of the multi-leader election algorithm to determine a current assignment of respective ones of the participants as leaders for respective processing tasks of the distributed computing system;
wherein interacting with the coordination service in performing an iteration of the multi-leader election algorithm comprises:
obtaining values of one or more of a participant identifier data structure and an election results data structure from the coordination service;
utilizing the obtained values to maintain a stack data structure in which participants are sorted into entries of the stack data structure based at least in part on number of processing tasks for which they are assigned as leader; and
responsive to at least one of the processing tasks not currently having an assigned leader:
assigning a particular participant to a given one of the previously unassigned processing tasks based at least in part on a position of an entry for that participant in the stack data structure;
updating the stack data structure and one or more corresponding values of at least one of the participant identifier data structure and the election results data structure with the coordination service; and
repeating the assigning and updating until leaders are assigned to all of the processing tasks.

2. The apparatus of claim 1 wherein the at least one processing device comprises at least a portion of a particular one of the compute nodes of the distributed computing system.

3. The apparatus of claim 1 wherein the coordination service comprises one or more servers that are external to the distributed computing system.

4. The apparatus of claim 1 wherein the coordination service maintains one or more data structures for the multi-leader election algorithm implemented in the distributed computing system.

5. The apparatus of claim 4 wherein the one or more data structures comprise at least a participant identifier tree and an election results tree, the participant identifier tree comprising a plurality of leaf nodes for respective ones of the participant identifiers, and the election results tree comprising a plurality of leaf nodes indicating respective ones of the participants currently elected as leaders for respective ones of the processing tasks.

6. The apparatus of claim 1 wherein establishing with a coordination service for one or more distributed applications a participant identifier for a given participant in a multi-leader election algorithm comprises:
requesting creation of a participant identifier tree node for the given participant as a sequential and ephemeral node; and
receiving the participant identifier for the given participant in response to the request.

7. The apparatus of claim 1 wherein the values of the participant identifier data structure comprise values of participant identifier tree nodes, and the values of the election results data structure comprise values of election results tree nodes.

8. The apparatus of claim 1 wherein each of at least a subset of the entries of the stack data structure comprises a participant identifier and information indicating one or more of the processing tasks for which the corresponding participant is assigned as a leader.

9. The apparatus of claim 1 wherein the entries of the stack data structure are organized in order of increasing number of processing tasks for which the corresponding participant is assigned as a leader, with a first one of the participants having a highest number of assigned processing tasks having a lowest entry in the stack data structure and a second one of the participants having a lowest number of assigned processing tasks having a highest entry in the stack data structure, with entry positioning for participants having a same number of assigned processing tasks being resolved utilizing their respective participant identifiers.

10. The apparatus of claim 1 wherein assigning a particular participant to a given one of the previously unassigned processing tasks based at least in part on a position of an entry for that participant in the stack data structure comprises assigning the participant having the highest entry in the stack data structure as the leader for the given processing task.

11. The apparatus of claim 1 wherein the at least one processing device is further configured to rebalance assignment of tasks between participants responsive to detection of at least a threshold difference between respective numbers of processing tasks assigned to a first one of the participants having a highest number of assigned processing tasks and a second one of the participants having a lowest number of assigned processing tasks.

12. The apparatus of claim 11 wherein the rebalancing of assignment of tasks between participants comprises reassigning at least one of the processing tasks from the first participant to the second participant, and updating the stack data structure and one or more corresponding values of election results tree nodes with the coordination service.

13. The apparatus of claim 1 wherein interacting with the coordination service in performing an iteration of the multi-leader election algorithm comprises:
establishing at least a portion of a watch loop among the participants in accordance with a watch utility of the coordination service; and
utilizing the watch loop to detect departure of one or more of the participants from participation in the multi-leader election algorithm;
wherein the watch loop is configured based at least in part on participant identifiers with each participant monitoring another one of the participants adjacent to it in the watch loop in accordance with their respective participant identifiers.

14. The apparatus of claim 1 wherein the at least one processing device is further configured for at least one of the distributed applications:

to determine via the coordination service whether or not a given participant is currently assigned as a leader for a particular one of the processing tasks; and responsive to an affirmative determination, causing the given participant to perform the particular processing task.

15. A computer program product comprising a non-transitory processor-readable storage medium having stored therein program code of one or more software programs, wherein the program code when executed by at least one processing device comprising a processor coupled to a memory, causes the at least one processing device:

to establish with a coordination service for one or more distributed applications a participant identifier for a given participant in a multi-leader election algorithm implemented in a distributed computing system comprising multiple compute nodes, the compute nodes corresponding to participants having respective participant identifiers; and to interact with the coordination service in performing an iteration of the multi-leader election algorithm to determine a current assignment of respective ones of the participants as leaders for respective processing tasks of the distributed computing system;

wherein interacting with the coordination service in performing an iteration of the multi-leader election algorithm comprises:

obtaining values of one or more of a participant identifier data structure and an election results data structure from the coordination service;

utilizing the obtained values to maintain a stack data structure in which participants are sorted into entries of the stack data structure based at least in part on number of processing tasks for which they are assigned as leader; and responsive to at least one of the processing tasks not currently having an assigned leader:

assigning a particular participant to a given one of the previously unassigned processing tasks based at least in part on a position of an entry for that participant in the stack data structure;

updating the stack data structure and one or more corresponding values of at least one of the participant identifier data structure and the election results data structure with the coordination service; and repeating the assigning and updating until leaders are assigned to all of the processing tasks.

16. The computer program product of claim 15 wherein establishing with a coordination service for one or more distributed applications a participant identifier for a given participant in a multi-leader election algorithm comprises:

requesting creation of a participant identifier tree node for the given participant as a sequential and ephemeral node; and receiving the participant identifier for the given participant in response to the request.

17. The computer program product of claim 15 wherein the values of the participant identifier data structure comprise values of participant identifier tree nodes, and the values of the election results data structure comprise values of election results tree nodes.

18. A method comprising:

establishing with a coordination service for one or more distributed applications a participant identifier for a given participant in a multi-leader election algorithm implemented in a distributed computing system comprising multiple compute nodes, the compute nodes corresponding to participants having respective participant identifiers; and interacting with the coordination service in performing an iteration of the multi-leader election algorithm to determine a current assignment of respective ones of the participants as leaders for respective processing tasks of the distributed computing system;

wherein interacting with the coordination service in performing an iteration of the multi-leader election algorithm comprises:

obtaining values of one or more of a participant identifier data structure and an election results data structure from the coordination service;

utilizing the obtained values to maintain a stack data structure in which participants are sorted into entries of the stack data structure based at least in part on number of processing tasks for which they are assigned as leader; and responsive to at least one of the processing tasks not currently having an assigned leader:

assigning a particular participant to a given one of the previously unassigned processing tasks based at least in part on a position of an entry for that participant in the stack data structure;

updating the stack data structure and one or more corresponding values of at least one of the participant identifier data structure and the election results data structure with the coordination service; and repeating the assigning and updating until leaders are assigned to all of the processing tasks.

19. The method of claim 18 wherein establishing with a coordination service for one or more distributed applications a participant identifier for a given participant in a multi-leader election algorithm comprises:

requesting creation of a participant identifier tree node for the given participant as a sequential and ephemeral node; and receiving the participant identifier for the given participant in response to the request.

20. The method of claim 18 wherein the values of the participant identifier data structure comprise values of participant identifier tree nodes, and the values of the election results data structure comprise values of election results tree nodes.

* * * * *